March 11, 1930.　A. P. HELDENBRAND　1,750,518
STEERING KNUCKLE
Filed Dec. 8, 1925　2 Sheets-Sheet 2
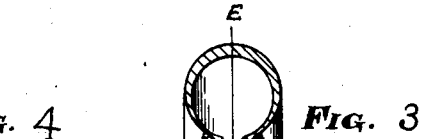
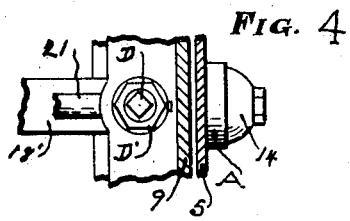
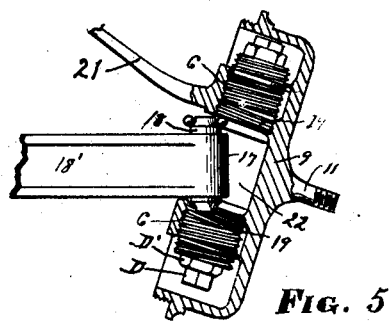
INVENTOR.
Arthur P. Heldenbrand
BY
ATTORNEY.

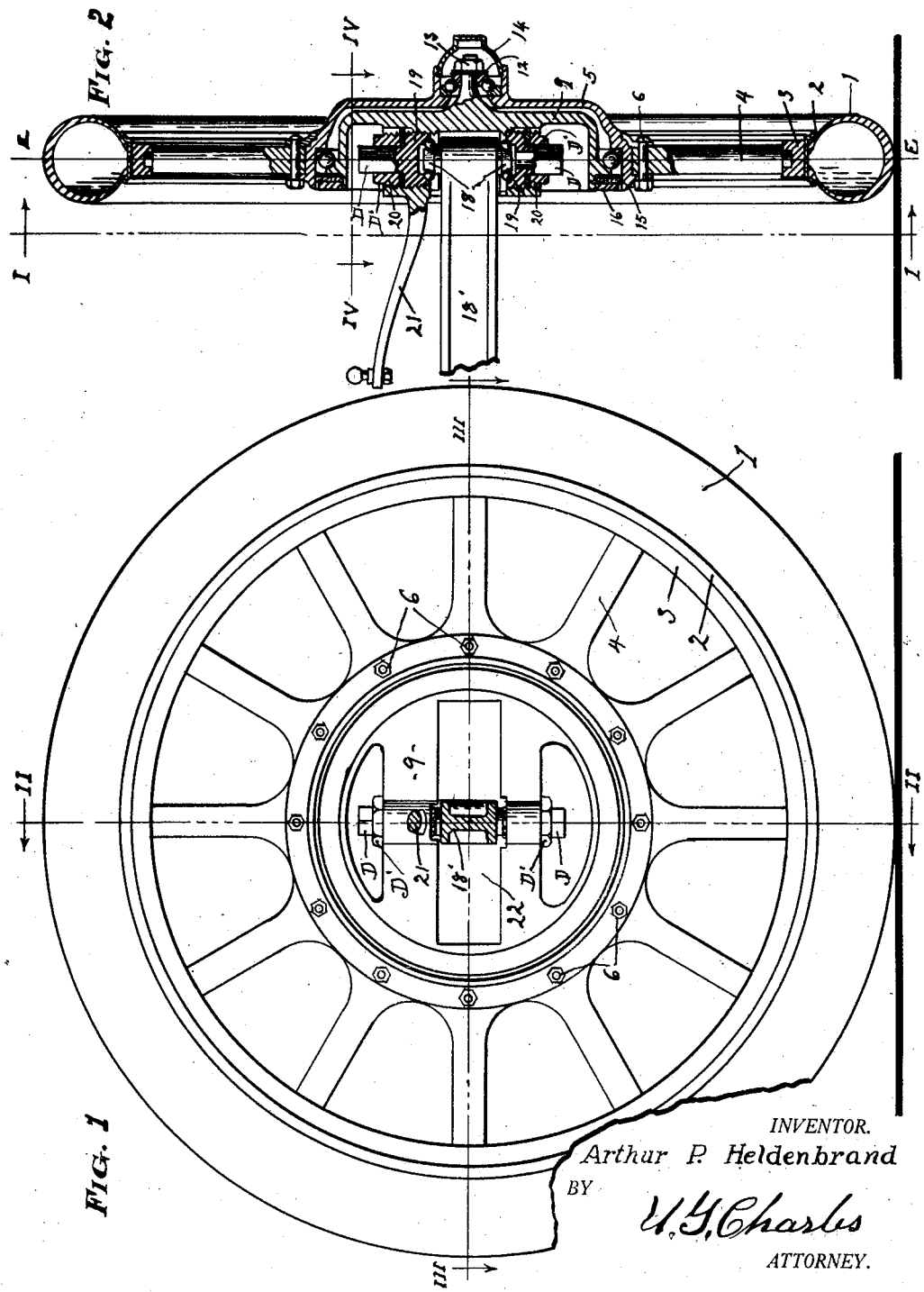

Patented Mar. 11, 1930

1,750,518

UNITED STATES PATENT OFFICE

ARTHUR P. HELDENBRAND, OF THREE SANDS, OKLAHOMA

STEERING KNUCKLE

Application filed December 8, 1925. Serial No. 74,136.

My invention relates to steering knuckles for motor driven vehicles, such as automobiles, tractors and the like, and any vehicle or implement of any kind requiring steering apparatus, and has for its chief object a pivotal point concentric to the body of the wheel, eliminating unusual strain on the bearing.

A further object of my invention is to provide a bearing that the axis thereof will be in axial alignment with the tread of the tire.

A still further object of my invention is to provide a steering knuckle so positioned as to eliminate a side thrust on the steering arm.

A still further object of my invention is to eliminate the usual conversion of the front wheel, eliminating unnecessary wear on the tires.

These and other objects will hereinafter be more fully explained.

Referring to the drawings;

Fig. 1 is an elevation of the inside of a steering wheel.

Fig. 2 is a sectional view taken on line II—II in Fig. 1, looking in the direction of the arrow.

Fig. 3 is a sectional view taken on line III—III in Fig. 1 looking in the direction of the arrow.

Fig. 4 is a sectional view taken on line IV—IV in Fig. 2 looking in the direction of the arrow.

Fig. 5 is a view partly in section showing the mode of assembling the bearings.

Referring to the drawings in detail, 1 is the tire being supported by a rim 2 and a felloe 3, 4 are the spokes and to the base of the spokes I have attached a housing 5 by means of bolts 6. The said housing having a ball race 7 and a spindle ball race 8 functioning as hereinafter described.

The said housing being revolvably mounted on a disc like bearing 9 functioning as a knuckle, and on the periphery thereof is a ball race 10 functioning as a ball bearing, and as adjusting means for said bearing I have provided a spindle 11 having a race 12 thereon tensioned by a nut 13. The said spindle and bearings are protected by a hub cap 14 which is threaded into the hub A of housing 5, and as a dust proof means for the adjacent ball bearing I have provided a felt washer 15 which is securely held in position by an annular ring 16, said ring being threaded to the bearing as at B. Concentrically positioned to said bearing is a knuckle 17 comprising a knuckle pin having a ball race on each end thereof, and adapted to engage in the ends of studs 19 having a ball race therein. The said members constitute a ball bearing and the said studs being threaded as at CC are means for adjusting said bearings. When properly adjusted I have provided a nut lock 20 which is screwed firmly in contact with the studs, by applying a wrench to the members D and D'.

Integral with said bearing 9 is an arm 21 as guiding means for the wheel. The axis of the knuckle 17 is positioned on the transverse axis of the wheel as indicated by line E by which means the usual side draft is eliminated and also the excess tension required for steering the wheels. And as the steering wheels may be set parallel to each other it will be readily seen that the usual creep at the traction point is eliminated. Heretofore the axis of the knuckle has been positioned well to one side of the wheel, and to overcome the tendency of spreading the wheel at the front while being driven, they were positioned slightly converging, causing the tires to creep or slide during their rotation causing excess wear on the tread of the tires.

On the diametrical axis of the bearing 9 I have provided a channel 22 being slightly greater in width than the axle 18 by which means the wheel may be turned abruptly with respect to the axle. The washer functioning as a dust proof means for the spindle ball bearings, removed for convenience of illustration, therefore it will be understood that such precaution has been well considered.

Such modifications may be employed as lie within the scope of the appended claim.

Having thus described my invention, what I claim as new and desire to secure by Letters Patent is:—

In a front wheel mounting for automotive vehicles and the like, an annular member formed concentric to a wheel at its center and being trunnioned therein by ball bearings, a spindle bracket diametrically positioned on the said annular member, the said spindle bracket being divided at the center to accommodate a knuckle pin mounted in the end of an axle, ball races threadedly engaging in the portions of the divided spindle bracket and forming thrust bearings for the upper and lower portions of the knuckle pin, and means to lock the ball races in the desired position substantially as shown.

ARTHUR P. HELDENBRAND.